United States Patent [19]
Heckel et al.

[11] Patent Number: 5,154,868
[45] Date of Patent: Oct. 13, 1992

[54] METHOD OF MANUFACTURING A RANDOMLY PATTERNED FLOOR COVERING FROM A PREFORM OF RUBBER

[75] Inventors: Klaus Heckel, Gorxheimertal; Herbert Arnold, Mörlenbach; Dieter Rischer, Abtsteinach, all of Fed. Rep. of Germany

[73] Assignee: Firma Carl Freudenberg, Weinheim, Fed. Rep. of Germany

[21] Appl. No.: 618,596

[22] Filed: Nov. 28, 1990

Related U.S. Application Data

[63] Continuation of Ser. No. 384,320, Jul. 24, 1989, abandoned.

Foreign Application Priority Data

Jul. 26, 1988 [EP] European Pat. Off. ........ 88111988.7
Oct. 11, 1988 [DE] Fed. Rep. of Germany ....... 8812749

[51] Int. Cl.⁵ .............................................. B29C 43/20
[52] U.S. Cl. ..................................... 264/162; 264/77; 264/145; 264/157; 264/175; 264/293; 264/325; 264/245; 264/347; 264/139
[58] Field of Search ..................... 264/74, 76, 77, 139, 264/158, 160, 146, 122, 123, 175, 245, 347, 157, 320, 325, 293, 162, 145

[56] References Cited

U.S. PATENT DOCUMENTS

| | | | |
|---|---|---|---|
| 1,486,208 | 3/1924 | Weber | 264/139 |
| 1,634,955 | 7/1927 | Mell | 264/158 |
| 1,816,822 | 8/1931 | Bell | 264/76 |
| 1,830,141 | 11/1931 | Stone | 264/139 |
| 2,244,565 | 6/1941 | Nast | 264/139 |
| 2,915,785 | 12/1959 | Valentini | 264/245 |
| 3,383,442 | 5/1968 | Mountain | 264/76 |
| 4,076,567 | 2/1978 | Yoshikawa et al. | 264/115 |

FOREIGN PATENT DOCUMENTS 2836642 2/1980 Fed. Rep. of Germany.

Primary Examiner—Jeffery Thurlow
Assistant Examiner—Mathieu Vargot
Attorney, Agent, or Firm—Kenyon & Kenyon

[57] ABSTRACT

A method of manufacturing a randomly patterned floor covering having contrastingly-colored zones from a preform of rubber in which the preform is cut in pieces, each of which are molded into a blank having projections extending from a top side of the blank in relief-like fashion, solidified by vulcanization and then machined by cutting only in the region of the projections. The rubber forming the contrastingly-colored zones is mixed with contrastingly-colored particles in an amount of at least ten percent by weight. These particles are substantially free of flat surfaces and are in, at least, an advanced state of vulcanization. The particles located in the projections extending from the top side of the blank are exposed during the cutting step.

7 Claims, 1 Drawing Sheet

METHOD OF MANUFACTURING A RANDOMLY PATTERNED FLOOR COVERING FROM A PREFORM OF RUBBER

This application is a continuation of application Ser. No. 07/384,320, filed Jul. 24, 1989, now abandoned.

BACKGROUND OF THE INVENTION

The invention relates generally to a method of manufacturing a randomly patterned floor covering having contrastingly-colored zones from a preform of rubber and, more particularly, to an improved method in which the preform is cut into pieces, which are molded into the shape of blanks having projections extending from the top side thereof in a relief-like fashion, solidified by vulcanization and then machined by cutting only in the region of the projections.

This type of method is disclosed in DE-OS2836642 in which a thick lower layer and a thin upper layer are placed into a forming tool and pressed together. Randomly placed recesses in the forming tool are used to form projections in a relief-like fashion at the side of the blank that eventually is exposed for viewing. The projections are ground off this side after vulcanization in such a manner that the upper flat portion is completely removed at this point and the contrastingly-colored lower flat portion becomes visible. The upper and the lower portions require separate production and processing, which results in considerable costs.

In U.S. Pat. No. 1,816,822, a method for producing a rubber floor covering is disclosed in which contrastingly-colored, vulcanized rubber particles are distributed in an unvulcanized rubber mixture. The ensuing conglomerate mass is subsequently drawn into a sheet after which a semi-curing process, in which the conglomerate mass is partly vulcanized, occurs. Next the upper side of the sheet is sanded or buffed to cut back the outer surface and expose the particles. Finally, the vulcanization process is completed. The contrastingly-colored zones, which are determined by the location of the particles, are related to each other by a statistical distribution. An observer viewing a floor covering made according to this method will receive an overall impression of a speckled or marblized appearance. A floor covering having a pattern of a defined shape cannot be obtained with this method.

SUMMARY OF THE INVENTION

One of the problems to which the invention is directed is provision of a method of manufacturing a rubber floor covering that can be carried out simply and generates contrastingly-colored zones that appear in randomly, predeterminately patterned, regions on the surface of the covering. The invention solves this problem by providing a method of manufacturing a randomly patterned floor covering having contrastingly-colored zones from a preform of rubber in which the zones are formed by uniformly mixing a rubber mixture of one color with contrastingly-colored particles of another color in an amount of at least ten percent by weight. The particles are substantially free of flat surfaces and are in at least an advanced state of vulcanization. After complete mixing of the particles, a preform is drawn by appropriate processing in a rolling mill or calendar. The preform then is cut into pieces, which are placed in a pressing tool to form projections in the top surface of the pieces. Each piece is simultaneously vulcanized to form to a blank. The tops of the projections of the vulcanized blank then are cut off such that the particles located within the projections become visible.

Particularly advantageous results can be achieved when the contrastingly-colored particles are mixed in amounts between ten and fifty percent by weight, with an amount of thirty percent by weight being preferred. The most advantageous particle diameter lies in the range of 1.2-1.4 mm.

As discussed above, the projections may be formed in a pressing tool. A particularly good pattern can be obtained if the blank is vulcanized with the eventual top side facing downward. The cutting off of the tops of the projections may be carried out by a grinding or splitting machine and the entire projection, rather than just the top, may be removed.

Further features, advantages and embodiments of the invention are apparent from consideration of the following detailed description, drawings and appended claims.

DETAILED DESCRIPTION

Figure 1:
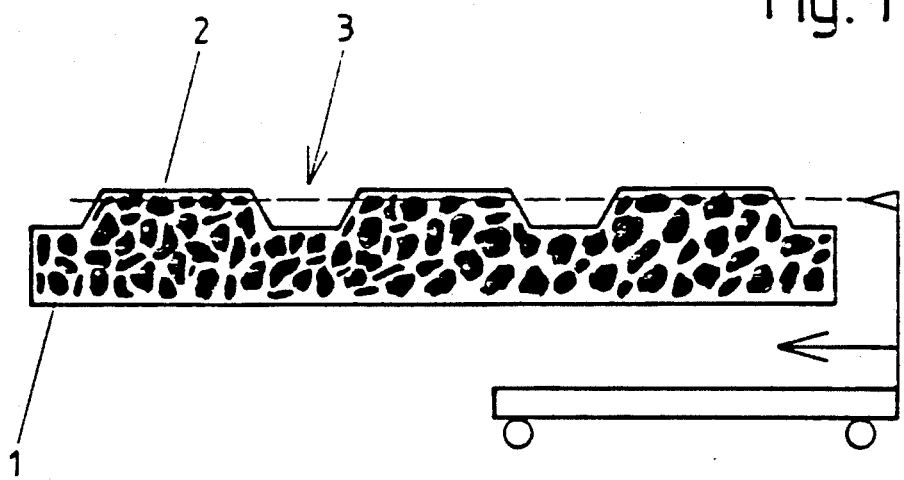
FIG. 1 schematically shows a sectional view of a blank formed according to the method of the invention and an apparatus for carrying out the cutting step of the method.
Figure 2:
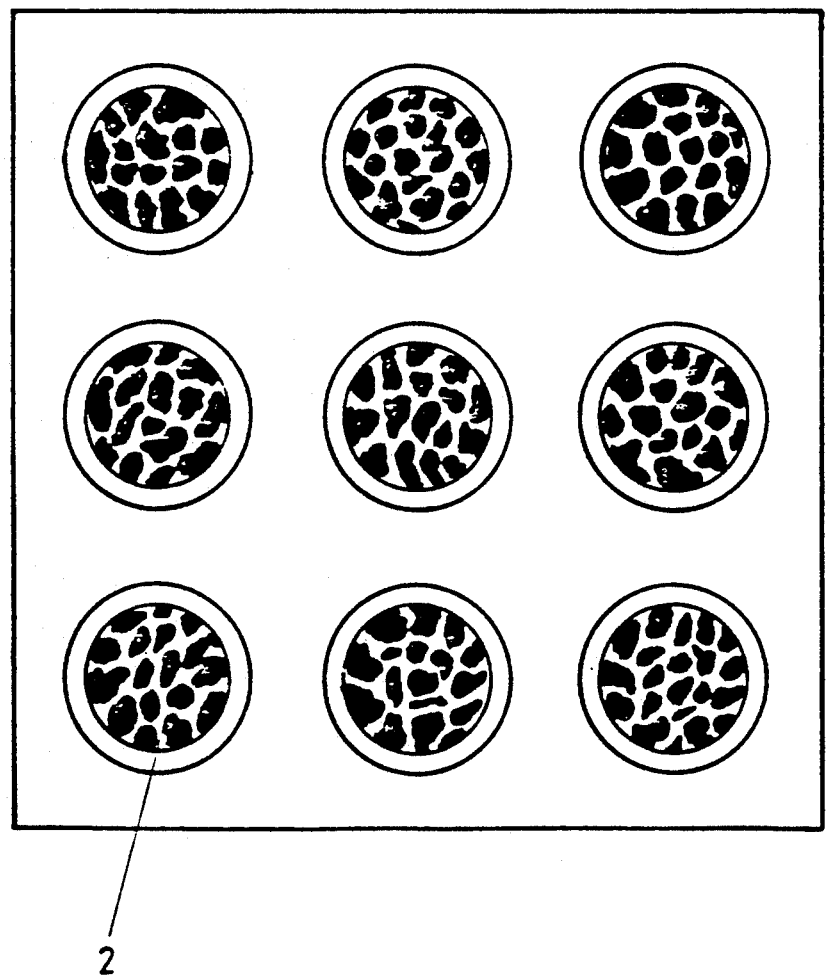
FIG. 2 shows a top view of a floor covering made in accordance with the method of the invention.

The rubber mixture and the particles used in the mixing step of the invention are dyed differently to have contrasting colors. The rubber material forming the particles is in, at least, an advanced state of vulcanization compared to the rubber mixture. The particles thereby are inhibited during vulcanization of the blank from softening with the rubber mixture, which precludes mutual mixing of the dyes contained in the particles and in the rubber. In this manner, the particles in the floor covering made according to the invention are precisely delineated from the surrounding rubber mixture. This same effect can be achieved if the particles are only in an initially vulcanized state and the rubber is in an unvulcanized state when mixed.

The particles are substantially free of any flat surface areas, which ensures that during mixing with the rubber mixture the particles are covered on all sides with the rubber mixture. Thus, after being molded into the form of the blank, the particles are no longer visible at the outer surfaces of the blank. Hence, after the blank has been vulcanized, it has substantially the same color as the color of the rubber mixture employed.

The amount of Contrastingly-colored particles is relatively high; with at least ten percent by weight compared to the weight of the blank, the overall color impression of the blank is substantially determined by the particles, which are exposed by cutting off the tops of the projections. The tops of the projections of the finished floor covering aesthetically appear as patterned zones, which are clearly delineated from the surrounding unmachined area of the upper side of the floor covering. The floor covering made according to the invention is distinguished by its patterned projections and particularly high durability. One advantage of the method of the invention is that the floor covering retains its original appearance to a large degree, even after intensive use and a long period of time has passed.

The maximum amount of contrastingly-colored particles that should be used is fifty percent by weight to ensure that the particles are completely incorporated, when being mixed, into the rubber mixture. As a higher amount of particles is used, the danger of seeing individual particles shining through the floor covering in the region of the unprocessed flat zones at the top side becomes increasingly prevalent. If this occurs, the overall pattern obtained can be adversely affected. A minimum content of contrastingly-colored particles of twenty percent by weight and, more advantageously, of thirty percent by weight is preferred, while the upper limit of fifty percent by weight should be observed.

The particles should have a diameter that is smaller than the thickness of the floor covering, but large enough to let the particles appear distinctly when viewed at a distance from the human eye of 2 to 3 m. Mixing-in of dust waste is as equally unsuitable as the mixing-in of particles having a thickness larger than the thickness of the floor covering at the thinnest point. Under normal conditions, it is advantageous to use particles having a mean diameter of 1.2 to 1.4 mm, With the amount of particles in dust form (having a diameter of less than 0.5 mm) being less than 2 percent by weight. A regular curvature of the surface of the particles is not necessary, as long as the presence of basically flat, particle surfaces is predominately precluded. The most advantageous benefits of the invention can be obtained if the presence of flat surfaces is completely eliminated.

As noted above, the projections may be formed in the blank, which is in the pre-vulcanized plastic state, by means of a pressing tool. Depending on the form of the particular pressing tool used, the location of the projections can be randomly set in desired patterns, which are permanently fixed during the subsequent vulcanization of the blank.

The use of a pressing tool results in a particularly precise formation of the projections in a relief-like manner. During the cutting process, the projections may be removed entirely. A particularly good pattern can be obtained if the blank is vulcanized with the top side facing down. In this manner, the contrastingly-colored particles are incorporated and fixed into the region of what later becomes the top side of the covering with a particular degree of uniformity.

The machining of the cutting process may be performed by means of a grinding or splitting machine in which a linear cut is generally applied. This type of operation is simple to carry out on a large scale, and ensures a great amount continuity of the end products obtained.

Specific examples made in accordance with the method of the invention are discussed below.

EXAMPLE 1

In this example, 100 parts by weight of a rubber mixture of color 1 are mixed in an internal rubber mixer with 20 parts by weight of an already vulcanized rubber milling material of color 2 having a grain size of 1.2 to 1.4 mm, until complete mixing is achieved. From this mixture, a preform having a thickness of 5 mm is drawn in a rolling mill or a calendar. Pieces are cut from the preform and transported to a pressing tool, which is bounded on one side by a flat forming surface. The other side of the pressing tool is bounded by a square base having a side length of 35 mm and a forming surface that has depressions in the shape of truncated cones. The cones have a depth of 1.5 mm and a maximum diameter of 25 mm. The two forming surfaces are pressed against mutually opposite sides of a preform piece in such a manner that the piece is molded into the shape of the forming surfaces, thereby converting the piece into the shape of the blank shown in FIG. 1. The shape of the blank is permanently fixed by the simultaneously occurring vulcanization process.

The upstanding ends of the projections 2 of the blank are cut off in a manner shown in FIG. 1. In the cutting process, the particles located within the projections are exposed These particles substantially determine the overall color impression received when viewing the end faces of the projections 2. The surrounding unprocessed zones 3, on the other hand, continue to have the color 1 of the rubber mixture used.

EXAMPLE 2

In this example, 100 parts by weight of a rubber mixture of color 1 are mixed in a rubber mixer with 20 parts by weight of an already vulcanized rubber milling material of color 2 having an average diameter of 1.3 to 1.4 mm, until complete homogenization of the mixture is achieved. From this mixture, a preform with a thickness of 5 mm is drawn by means of a rolling mill, calendar or extruder.

Pieces of suitable size are cut from the preform and are molded in a pressing tool comprising a flat lower die part and an upper die part having depressions formed therein. The depressions are distributed in a pattern to form the projections in the surface of the molded piece. The rubber milling material particles of color 2 admixed to the rubber mixture of color 1 are almost completely surrounded by the rubber mixture. The blank obtained after vulcanization is suitably processed at the vicinity of the end faces of the relief-like projections such that the particles of the rubber milling material are exposed. These particles substantially determine the overall color impression of the end faces of the projections 2, while between the projections, the color 1 of the rubber mixture 2 is essentially preserved.

What is claimed is:

1. A method of manufacturing a predeterminately patterned floor covering having a background portion and contrastingly-colored zones arranged in a predetermined pattern on the background portion from a preform of rubber, said method comprising the steps of:

(a) mixing a rubber mixture of a first color with contrastingly-colored particles of a second color in an amount of at least ten percent by weight so as to form an evenly mixed, random arrangement of said contrastingly colored particles of a second color in the mixture, said particles having a diameter in the range of 1.2 to 1.4 mm, being substantially free of flat surfaces, and in, at least, an advanced state of vulcanization compared to the state of vulcanization of the rubber mixture;

(b) drawing a single-layered preform having a predetermined thickness from the rubber mixture obtained in step (a);

(c) cutting the preform into pieces;

(d) molding the pieces into respective blanks, each blank having a background portion having a first, average color density and a predetermined pattern of projections extending therefrom in a relief-like fashion on one side of the blank;

(e) solidifying the blanks by vulcanization; and (f) cutting off the tops of the predeterminately patterned projections to form a predetermined pattern of zones characterized by a second average color density formed by the random arrangement of the contrastingly colored particles that contrasts with the first color density of the background portion.

2. The method of claim 1 wherein the contrastingly-colored particles are mixed in an amount of at least twenty percent by weight.

3. The method of claim 1 wherein the contrastingly-colored particles are mixed in an amount of at least thirty percent by weight.

4. The method of claim 1 wherein the relief-like projections are formed with the aid of a pressing tool.

5. The method of claim 1 wherein the blank is vulcanized with said one side facing downward.

6. The method of claim 1 wherein the cutting step f) is performed with the aid of a grinding or splitting machine.

7. The method according to claim 1 wherein the projections are completely removed during the cutting step f).

* * * * *